United States Patent [19]

Wyller

[11] 4,353,640
[45] Oct. 12, 1982

[54] PRINT MAKER

[76] Inventor: Arne A. Wyller, Stockholm Observatory, S-133 00 Saltsjöbaden, Sweden

[21] Appl. No.: 195,123

[22] Filed: Oct. 8, 1980

Related U.S. Application Data

[63] Continuation of Ser. No. 4,437, Jan. 18, 1979, Pat. No. 4,239,376.

[51] Int. Cl.³ ............................................. G03B 27/52
[52] U.S. Cl. ...................................... 355/21; 355/27; 355/44; 355/71
[58] Field of Search ..................... 355/18, 27, 45, 44, 355/67, 71, 21

[56] References Cited

U.S. PATENT DOCUMENTS

| 2,231,395 | 2/1941 | Schlegel | 355/21 |
|---|---|---|---|
| 2,797,615 | 7/1957 | Coleman | 355/21 X |
| 3,677,636 | 7/1972 | Stein | 355/18 |
| 3,689,148 | 9/1972 | Black | 355/18 |
| 4,026,651 | 5/1977 | Vitou | 355/44 |
| 4,082,446 | 4/1978 | Driscoll et al. | 355/27 |
| 4,135,784 | 1/1979 | Larrick | 355/21 X |
| 4,184,763 | 1/1980 | Handsman et al. | 355/27 |
| 4,230,407 | 10/1980 | Möller | 355/21 X |
| 4,239,376 | 12/1980 | Wyller | 355/39 X |

Primary Examiner—Richard A. Wintercorn
Attorney, Agent, or Firm—Steele, Gould & Fried

[57] ABSTRACT

A compact and transportable apparatus for making instant prints from slides or transparencies, without the need for darkroom facilities, is attachable to standard projection equipment. The self-contained unit comprises: a housing having a lens-shutter assembly and means for attaching a film pack in operable relation to the lens-shutter assembly; a slide station having means for holding a slide or transparency to be copied; and, a light diffuser assembly, for evenly illuminating the slide during copying, whereby an optical path is formed starting in the diffuser assembly, passing through the slide or transparency, the lens-shutter assembly, and ending on said film pack. The lens and slide station of standard projection equipment may be employed with the attachable unit which positions the film pack at a distance within focusing range of the projection equipment, a shutter in the attachable unit controlling the incidence of light. The attachable unit may be adjusted for print size and focus by removably positioning a translucent member at the film plane, and adjusting the image for sharpness.

8 Claims, 6 Drawing Figures

PRINT MAKER

BACKGROUND OF THE INVENTION

Cross Reference to Related Applications

This is a continuation of my co-pending application Ser. No. 4,437, filed Jan. 18, 1979, and now U.S. Pat. No. 4,239,376, issued Dec. 16, 1980.

1. Field of the Invention

The invention relates to photographic printmakers, and in particular, to a novel apparatus for making prints from transparencies, commonly referred to as "slides," by the use of self-developing films.

2. Description of the Prior Art

Today, with the expanding use of 35-mm cameras reaching a mass-audience not familiar with or willing to be familiar with old-fashioned darkroom techniques, there is an evergrowing need for extremely simple-to-operate devices for making prints in standard enlarged formats from slides. Often during a slideshow (private or public), someone in the audience (family, friends or general public) would like a print of a particular slide shown, or the amateur-photographer himself would like prints of some of his own slides to put into his print-book. Each of the people would like these prints instantly and simply produced without fuss and without the need for having the slides processed by ordinary professional or commercial firms.

There are known in the prior art a number of photographic printing devices, but none totally fulfills the requirement of utmost simplicity of operation in the conversion of slides or transparencies to prints in standard sizes. Among the more recent patents is U.S. Pat. No. 4,026,651, which incorporates the simplifying element of self-developing film but applies it to providing a print from another photographic print, i.e. a print to print conversion. Also known is the transparency copying attachment of U.S. Pat. No. 3,689,148, which attaches to an already existing camera and basically converts one transparency to another transparency, i.e. a slide to slide conversion. Finally, there is the transportable photographic enlarger of U.S. Pat. No. 3,677,636; but, as the name implies, the device uses conventional techniques such as lightbulbs and photographic paper, and ultimately requires access to conventional darkroom facilities.

There is therefore a great need in the photographic art for a slide printmaker, which is compact, operable independently of darkroom equipment, easily operable by a person of minimum skill or training, but which delivers the print instantly. The printmaker should be inexpensive as well as simple to operate, and should allow slides to be conveniently copied at those times when the slides are viewed.

SUMMARY OF THE INVENTION

It is an object of this invention to provide an improved slide print maker of simple and compact construction.

It is a further object of this invention to provide an improved slide print maker which is operable independently of darkroom equipment and facilities, and preferably permits printmaking during a slide show, but without major disruption thereof.

It is another object of this invention to provide an improved slide print maker which may be operated by a person of minimum skill or training, but is yet within the financial range of most persons.

It is yet another object of this invention to provide an improved slide print maker which delivers the print instantly at the time when the user first desires the print.

It is yet another object of this invention to provide an improved slide print maker of simple and compact construction, which is operable independently of darkroom equipment or facilities, and which may therefore be operated by a person with minimum skill or training, and which yields prints instantly.

These and other objects are accomplished by providing an apparatus comprising a housing, either having a lens-shutter, or employing the lens of a projection system in conjunction with a shutter assembly, and means for attaching a film pack in operable relation to the shutter or lens-shutter assembly. A slide station having means for holding a slide or transparency to be copied, and a light diffuser assembly for evenly illuminating the slide during copying are preferably included in the self-contained unit. The lens-shutter assembly, preferably including an enlarging lens with an electronic exposure meter-shutter assembly, projects an enlarged image of the slide onto the emulsion of the film pack, which is self-developing. The source of illumination for the light diffuser assembly may be natural sunlight, an electronic flash, a flash bulb, a quartz-halogen lamp or other suitable high temperature light source. The optical path is formed from the illumination source, through the diffuser assembly, if any, through the slide and lens-shutter assembly and onto the film pack. The respective elements along the optical path may be entirely within the self-contained unit, or partly included in the standard projection system. The apparatus may be made more compact by use of at least one mirror to fold the optical path as taught in my co-pending application Ser. No. 4,437, now U.S. Pat. No. 4,239,376. In order to use the self-contained apparatus, one need only insert a slide into the slide-holding means, press the shutter release button, and pull out the tab of the self-developing film, following established procedure for the use of self-developing film. If the film pack is motorized, the exposed film is extracted by pushing a second button. In order to use the apparatus with a standard projection system, one need only arrange the unit with a projector, so that the lens of the projector projects into the aperture provided in the unit for that purpose, adjust the focus to the distance of the film pack, and expose the film as described.

Further objects and features of the invention will be understood more readily upon reading the following descriptions, together with the drawings.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

An apparatus for making prints from slides or transparencies according to the subject invention comprises only a few principal components. The main component is a housing, having a shutter assembly and means for removably attaching a film pack in operable relation to the shutter assembly. A source of illumination, a lens, and a slide station having means for holding a slide or transparency to be copied may be included in a self-contained unit, or those elements of a standard projection system may be employed. A light diffuser assembly, for evenly and uniformly illuminating the slide or transparency during copying is preferably included in the self-contained unit. The components are disposed with respect to one another such that an optical path is formed starting at the source of illumination, which may comprise a light diffuser assembly, passing through the slide or transparency, through the lens-shutter assembly and onto the internally exposed emulsion of the film pack. To facilitate focusing, the self-contained unit comprises a translucent screen member, removably positionable at the focal plane of the self-contained unit. Where the illumination is natural light or photo flood lamps or the like, the source of illumination does not form an integral part of the apparatus. Similarly, where the invention is disposed with a stand-alone projector, the source of illumination, slide holding means and lens are integral parts of the projection system, the lens, however being disposed in the housing during print making. Where the apparatus utilizes a photoflash assembly, the optical path may be thought of as originating with the flash assembly.

Figure 1:
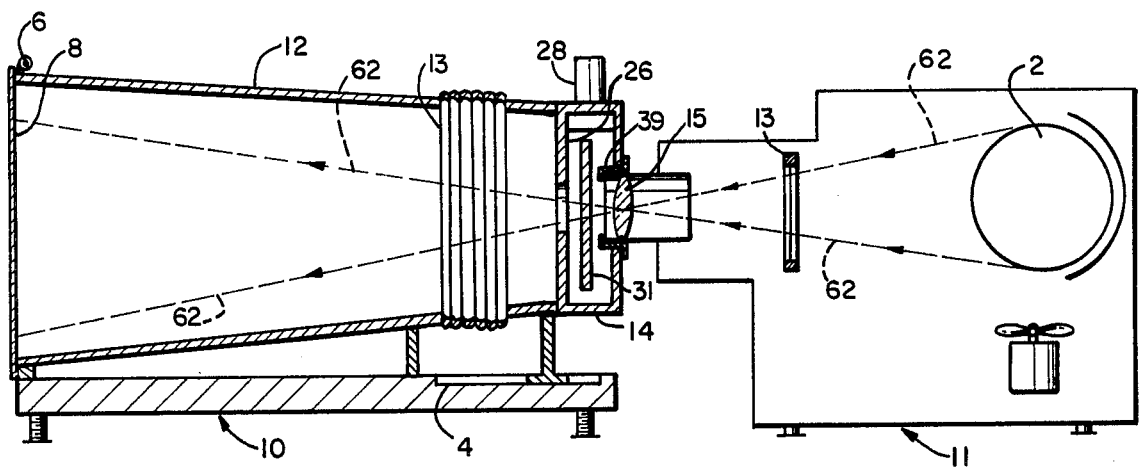
FIG. 1 is a side view of one embodiment of the subject invention, having the film pack removed for focusing, with the side wall cut away.
Figure 2:
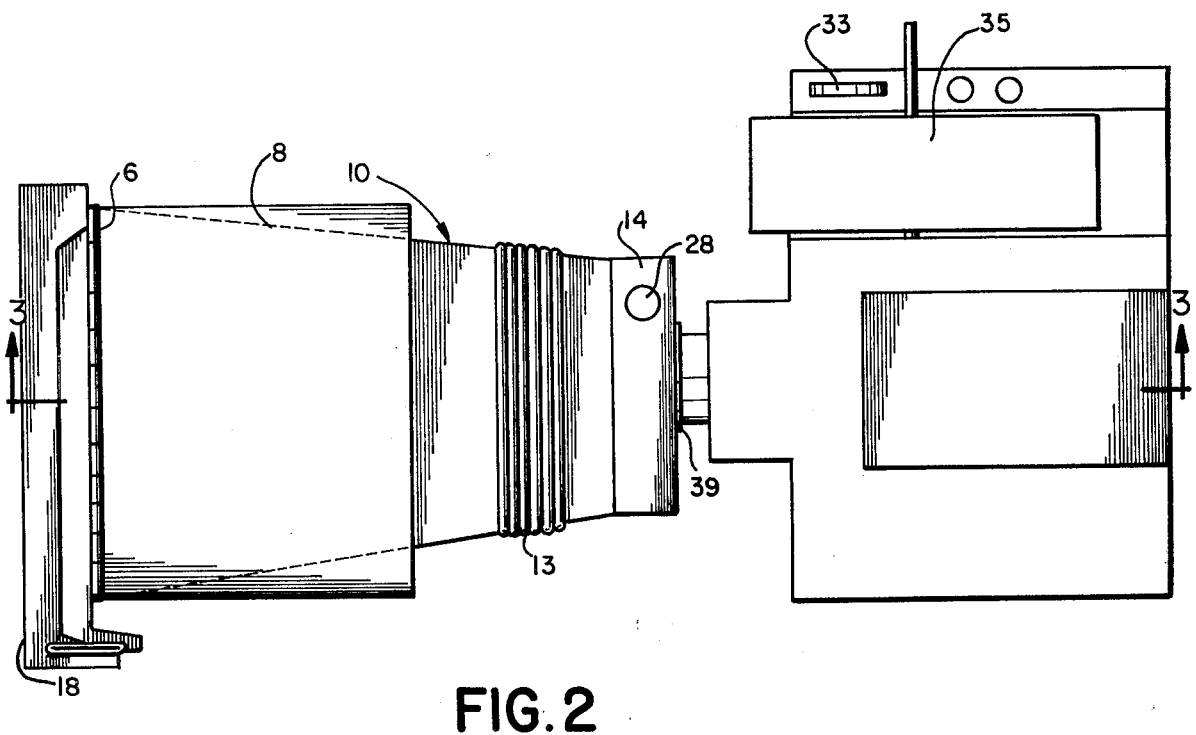
FIG. 2 is a top view of the embodiment of FIG. 1, all walls intact.
Figure 3:
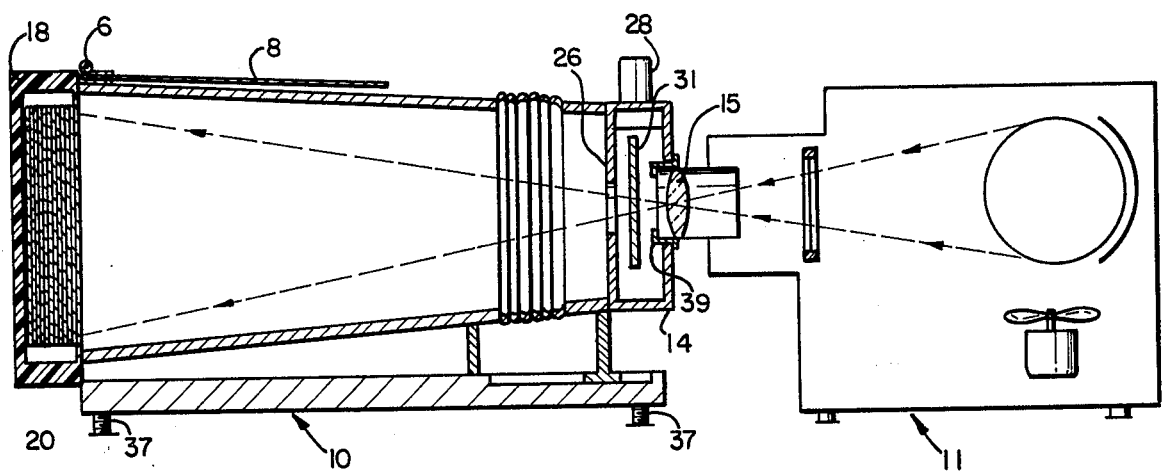
FIG. 3 is a section view taken along line 3—3 in FIG. 2.

Two preferred embodiments of the subject invention are illustrated in the drawings. Each of these embodiments comprises the principal components noted above, but differ in other respects as will be described in detail herein. The embodiment shown in FIGS. 1-3 is a particularly compact, convenient and inexpensive arrangement, which comprises only those elements necessary to convert stand-alone projector 11 into a print making apparatus. The embodiment of FIGS. 4-6 differs in that the elements of a projection system are integral parts of the unit. This embodiment is one which incorporates a source of illumination such as a photoflash, and accordingly, is completely self-contained. The embodiment illustrated in FIGS. 4-6 may also use diffuse natural or artificial ambient light 164 striking diffuser 142 to provide illumination. This embodiment is particularly useful in that the user may elect the photoflash, natural light or external floodlamp illumination means, because the light diffuser assembly is open, rather than along a closed path to a projector as in FIGS. 1-3. Each of these embodiments is most advantageous for different conditions, one for printmaking during a slide show, using the same equipment required therefor, one for self-contained printmaking using self-sufficient equipment. The two presently preferred embodiments will now be described in detail.

With reference to FIG. 1, the print maker 10 as shown comprises a housing 12, having a shutter assembly 14 and a translucent screen member 8 disposed in operable relation to the shutter assembly during the focusing step. Screen member 8 may be made of any translucent material such as plastic, but is preferably made of ground glass. The shutter assembly 14 comprises shutter 26, shutter release button 28 and neutral density filter 31. Neutral density filter 31 is, as known in the art, a disc of continuously varying opacity over the surface thereof. By adjusting the portion of filter 31 in front of the shutter opening, the amount of incident light can be controlled. Inasmuch as screen member 8 is positionable at the plane to be occupied by the film, the focus can be adjusted correctly by viewing the rear of screen 8 and positioning assembly 14 along slide track 4, thereby expanding or contracting bellows 13. In conjunction with adjustment of projector focusing wheel 33, both size and sharpness are thus adjusted. A slide station 13, having means for holding slides or transparencies to be copied, a lens 15 and a light source 2 are all standard parts of stand-alone projector 11, as is focus wheel 33. The slide or transparency may be inserted into projector 11 by means known in the art, such as the tray mechanism 35 pictured. The user then focuses the projector and apparatus for the desired size and sharpness of print, moves or detaches screen 8, mounts the film pack and shoots. Screen 8 is preferably positionable by rotation around hinge 6, however, alternatively, screen 8 may be provided with tabs or slots of identical dimensions as film pack 18, whereby screen 8 may be mounted and completely removed in the same manner.

The optical path through projector 11 and print maker 10 is shown in FIG. 1, by rays 62. While the depicted optical path is straight, a folded path could be provided using mirrors, thereby permitting larger print size. FIG. 2 illustrates the manner in which the film pack is mounted. With translucent screen 8 rotated to the top of the unit around hinge 6 (or removed via tabs or slots), film pack 18 is mounted, thereby placing the film at the same plane formerly occupied by screen member 8, and thereby ensuring correct focus. Film pack 18 preferably is affixed to the unit by means of slots and tabs along the edges thereof, which mate with corresponding slots or tabs on the housing 12 of printmaker 10.

As shown in FIG. 3, threaded feet 37 are fitted to the bottom of printmaker 10. By adjusting feet 37 individually, the optical axis of the printmaker can be adjusted to correspond with the optical axis of the projector, thereby avoiding distortion and ensuring an aligned image.

The bottom, top and side walls of the print maker 10 may be formed from sheet metal or plastic, and the bellows 13 from flexible plastic, cloth, or other opaque material. In order for the apparatus to function properly, the housing 12, which holds the shutter assembly and the film pack, must be light tight. Accordingly, the film pack 18 must be detachably mounted to the wall of the housing in a light tight fashion as is known in the art. The connection between projector 11 and printmaker 10 need not be absolutely light tight because shutter 26 is normally closed. The connection should be reasonably light tight to prevent light from entering along lines other than the optical path, blurring the print. Accordingly, a flexible skirt 39 is provided for mating with the extending portion of projector 11 holding lens 15. Skirt 39 is preferably a conical rubber washer, whereby a light-tight connection can be made with projectors of various makes, having a range of sizes of extending lens-holding members. When the projector is focused for close-up projection, as is herein required, the lens-holding member is almost fully extended, leaving a substantial protrusion to mate with skirt 39. In order to further enhance the quality and efficiency of the print maker, all of the internal walls of the print maker are of a flat black color or finish, such as with flock paper.

Figure 4:
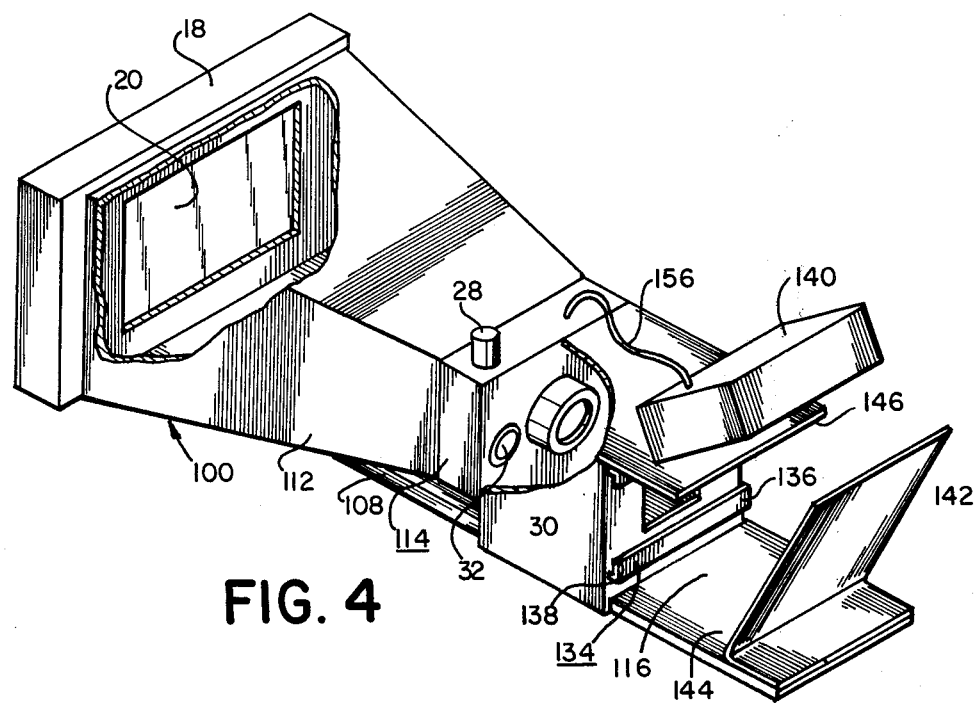
FIG. 4 is a perspective view of another embodiment of the subject invention, with portions of walls cut away.
Figure 5:
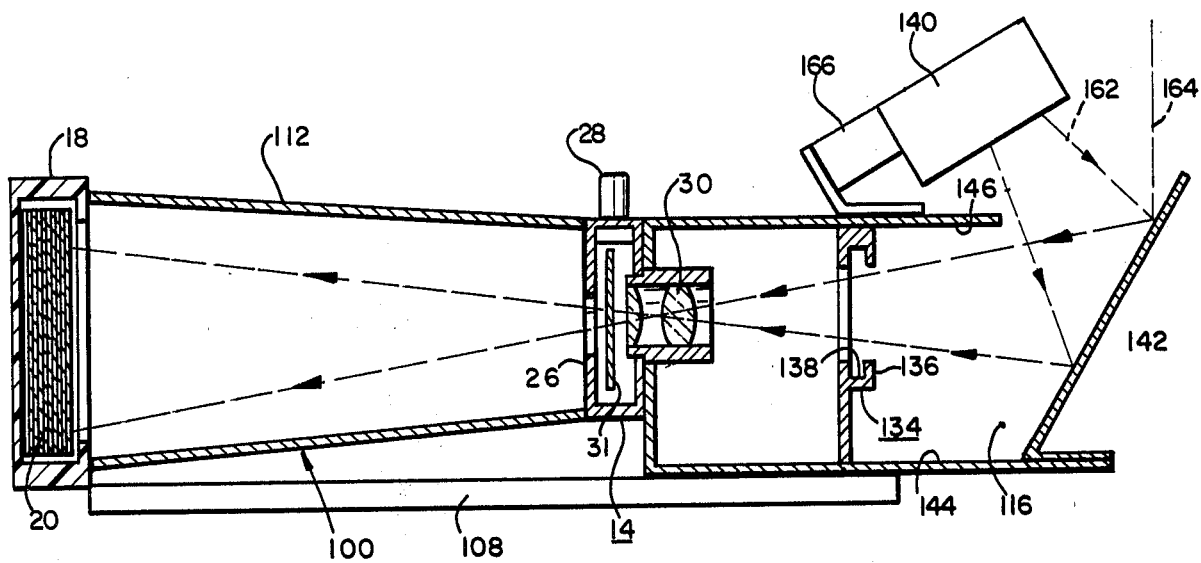
FIG. 5 is a side view of the embodiment of FIG. 4, with all side walls entirely cut away; and, FIG. 6 is a top view of the embodiment of FIG. 5.
Figure 6:
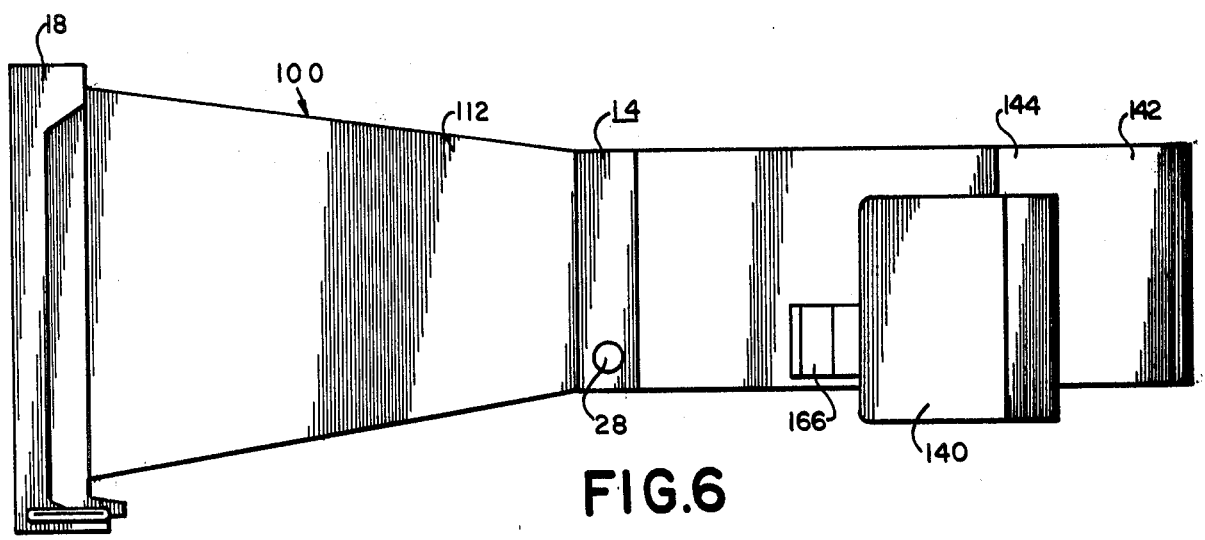

Referring to FIGS. 4-6, in a second embodiment the foregoing elements can be entirely self-contained. A diffuse source of illumination is provided by photoflash 140 illuminating diffuser 142. Ambient light from floodlamps or even the sky can serve to illuminate diffuser 142. Slide holding means 134 positions the slide in proper relationship to the optical path by means of slots 138.

In FIGS. 4-6, the distances between slide holder 134, lens 30 and film pack 18 are set, as known in the art, and need not ever be adjusted. The combined operation of projector 11 and printmaker 10 of FIGS. 1-3 is replaced in FIGS. 4-6 with a non-variable arrangement, where elements, such as the lens and shutter are joined. The functions of lens 15 and shutter 26 of FIGS. 1-3 are integrally performed by lens-shutter assembly 114 of FIGS. 4-6.

The lens-shutter assembly may be chosen from a number of suitable lens-shutter combinations known in the art. The function of the lens-shutter assembly is to project a well-focused image of the slide or transparency onto the emulsion of the self-developing film. The lens of the lens-shutter assembly may be chosen so that the image of the slide fills the entire image recording area of the film, or the print may be enlarged or decreased in size as desired. The shutter 26 of the lens-shutter assembly may be of the focal plane of leaf-type, also well known to those skilled in the art. Means for activating the shutter are incorporated in the mechanism activated by the shutter release button 28, which also synchronizes illumination of the photoflash means 40. This is provided by wire means 156, shown in FIG. 4. The aperture, or F-stop, of the lens-shutter assembly, can be regulated as necessary to provide the correct exposure. The lens-shutter assembly may also incorporate a neutral density filter 31 which assists in regulating exposure. It may also be desirable to provide the lens-shutter assembly with an exposure meter, driven by a photosensor 32 such as that shown in FIG. 4. In the presently preferred embodiment, the lens-shutter assembly 114 is an electronic lens-shutter assembly, as is known in the art. Self-developing film 20 for the film pack 18 is currently manufactured by the Polaroid and Kodak Corporations, and is sold under their respective trademarks. Such self-developing film as that sold by Polaroid normally contains a tab for drawing the film out of the pack after exposure. In other versions, the film pack is motorized, and the film is extracted by pushing a button.

It is contemplated that the lens-shutter assembly and the photoflash unit would be preset or adjusted to provide a properly exposed print from a properly exposed slide or transparency. Means would then be available, either by adjusting the F-stop, the shutter speed or the position of neutral density filter 31, to allow for copying slides which are over- or under-exposed, but correcting the exposure of the print during copying. The operational sequence is therefore extremely simple particularly when exposure is automatically controlled. The operator first inserts a slide or transparency through slot 138 in slide station 134. The operator then presses shutter release button 28. The operator then need only extract the exposed film 20 from film pack 18 to develop in the normal fashion. This involves only waiting the prescribed amount of time in the non-motorized version, before peeling off the cover of the film; or, in the motorized version, merely waiting for the film to be expelled and thereafter for the picture to develop spontaneously. The apparatus is safe, fast, and virtually foolproof. If for some reason the slide or transparency is not properly exposed, then adjustments may be made in order to produce a properly exposed print. In some instances, therefore, the copied print may be of even better quality than the slide or transparency from which it was made.

The embodiment shown in FIGS. 4-6 has a similar geometry with respect to the optical path, but since it is self-contained, it is, of course, a less compact configuration than that shown in FIGS. 1-3 for use with a projector. However, the embodiment shown in FIGS. 4-6 is particularly adapted for use with natural or external illumination means. With reference to FIG. 5, the print maker 100 comprises a housing 112, having a lens-shutter assembly 14 at one end and a film pack 18, containing self-developing film 20, at the opposite end. The housing 112 as well as the other components of the print maker 100 are mounted on structural support member 108. The print maker 100 further comprises a slide station 134 and a light diffuser assembly 116. The slide station 134 has slide or transparency supporting means 136, with access through side openings 138. The light diffuser assembly 116 is provided with light diffusing panels 142, 144 and 146, but need not be provided with side walls. Accordingly, although this embodiment may be provided with a photoflash unit 140, mounted on bracket 166, it may also be used with natural light or with an external floodlamp source, such as a quartz halogen lamp. Panel 146 also functions to prevent light from photoflash 140 from striking the slide directly, introducing spurious light. The shutter assembly may be identical to that described with respect to the embodiment shown in FIGS. 1-3, provided with a shutter 26, shutter release button 28 and neutral density filter 31. However, in FIGS. 4-6, a lens 30 is an integral part of the assembly.

The optical path is illustrated in FIG. 5, by rays designated 162 leaving flash unit 140. The figure also illustrates, by means of ray 164, that natural light or an external illumination means may be utilized.

As with the embodiment shown in FIGS. 1-3, the various walls, tops and bottoms of this apparatus may be sheet metal or molded plastic, preferably the latter, and preferably treated to minimize internal reflections.

The operation of this latter embodiment is similar to the first described embodiment. The slide or transparency to be copied is placed in slide station 134. Illumination is provided by orienting the apparatus to "catch" natural or photoflood light in the light diffuser assembly or by attaching a photoflash means. The shutter release is then depressed, and the film is developed, i.e., removed from the film pack, in the normal fashion.

The present invention may be embodied in other specific forms without departing from the spirit or essential attributes thereof, and accordingly, reference should be made to the appended claims rather than to the foregoing Specifications as indicating the scope of the invention.

I claim:

1. An apparatus for making prints from transparencies, for use with a stand-alone projector formed by a first housing in which are disposed a light source and a focusable image projection lens defining between them a first optical path, the projection lens being adjustably positionable along the first optical path in a range of positions which lies at least in part outside the first housing, and a transparency holding station disposed in the first optical path, the apparatus comprising:
   a second housing, light-tight except for one wall having an opening therethrough;
   a conically shaped resilient seal disposed in the opening for receiving the projection lens in light-tight relationship;
   a shutter assembly disposed in the housing, adjacent the seal;
   a detachable film holder forming at least part of another wall of the housing, the seal, the shutter assembly and the film holder defining a second optical path; and,
   adjustable means for orienting the second housing to align the first and second optical paths, whereby the image will be projected onto the film holder without distortion.

2. The apparatus of claim 1, further comprising a translucent member, movable into an operative position in the second housing in place of the detachable film holder, whereby the image may be focused on the transparent member in the second housing by adjustment of the projection lens in the first housing.

3. The apparatus of claim 2, wherein the translucent member is hingedly mounted to the second housing.

4. The apparatus of claim 1, further comprising light sensing means, operably connected to the shutter assembly, for automatically controlling exposure intervals.

5. The apparatus of claim 1, wherein said second housing further comprises an expansible element for selectably varying the distance between the shutter assembly and the film holder, whereby image size may be controlled.

6. The apparatus of claim 5, wherein the expansible element is a bellows.

7. The apparatus of claim 1, wherein the adjustable means for orienting the second housing comprises threadably mounted legs.

8. The apparatus of claims 1 or 4, further comprising an adjustably mounted neutral density filter disposed in the second housing adjacent the shutter assembly and movable into and out of the second optical path for controlling light intensity of the projected image.

* * * * *